(12) United States Patent
Pan et al.

(10) Patent No.: US 9,148,894 B1
(45) Date of Patent: Sep. 29, 2015

(54) FAST REMOTE EXECUTION BETWEEN MOBILE DEVICES

(75) Inventors: Ming-Chen Pan, Taipei (TW); Hui-Ming Tsai, Taipei (TW); Yen-Ju Lee, Taipei (TW); Chao-Kai Yu, Taoyuan (TW)

(73) Assignee: Trend Micro Inc., Tokyo (JP)

( * ) Notice: Subject to any disclaimer, the term of this patent is extended or adjusted under 35 U.S.C. 154(b) by 420 days.

(21) Appl. No.: 13/324,951

(22) Filed: Dec. 13, 2011

(51) Int. Cl.
*H04W 76/00* (2009.01)
*H04W 4/02* (2009.01)
*G08B 25/01* (2006.01)
*H04W 4/12* (2009.01)

(52) U.S. Cl.
CPC ............. *H04W 76/007* (2013.01); *H04W 4/02* (2013.01)

(58) Field of Classification Search
CPC ........... H04W 4/02; H04W 4/06; H04W 4/12; H04W 4/22; H04W 76/007; H04W 48/18; H04W 88/04; H04L 12/1895; H04L 12/5865; H04L 45/22; H04L 51/32; H04M 1/72536; H04M 1/72541; H04M 2242/04; G08B 21/0277; G08B 25/001; G08B 25/08; G08B 25/016; G08B 27/006
USPC ................... 455/404.1, 404.2, 466, 445, 455, 455/456.1–456.3, 456.5–456.6
See application file for complete search history.

(56) References Cited

U.S. PATENT DOCUMENTS

| | | | | |
|---|---|---|---|---|
| 8,521,122 | B2 * | 8/2013 | Scott et al. ................ | 455/404.1 |
| 2005/0085257 | A1 * | 4/2005 | Laird et al. ................ | 455/550.1 |
| 2007/0032219 | A1 * | 2/2007 | Rudolf et al. .............. | 455/404.1 |
| 2007/0218868 | A1 * | 9/2007 | Schefczik et al. ......... | 455/404.1 |
| 2009/0274104 | A1 * | 11/2009 | Addy .......................... | 370/329 |
| 2011/0063105 | A1 * | 3/2011 | Bennett et al. ........... | 340/539.11 |
| 2012/0184207 | A1 * | 7/2012 | Gaines et al. .............. | 455/11.1 |
| 2012/0225635 | A1 * | 9/2012 | Esbensen ................... | 455/404.2 |
| 2012/0252398 | A1 * | 10/2012 | Jacobs et al. .............. | 455/404.1 |
| 2013/0331058 | A1 * | 12/2013 | Harvey ...................... | 455/404.2 |
| 2014/0152453 | A1 * | 6/2014 | Dahl .......................... | 340/686.6 |

FOREIGN PATENT DOCUMENTS

WO   WO 2011059308 A2 *  5/2011

* cited by examiner

*Primary Examiner* — Brandon Miller
*Assistant Examiner* — Umair Ahsan
(74) *Attorney, Agent, or Firm* — Beyer Law Group LLP

(57) ABSTRACT

A method for remotely executing a command on a mobile device is provided. Here, a command to execute is received at a first mobile device, wherein the command includes a communications command requiring the use of a first communications medium. Then it is determined if the first mobile device can access the first communications medium. When the first mobile device cannot access the first communications medium, the command is forwarded via a second communications medium to a second mobile device for execution. When the first mobile device can access the first communications medium, the command is executed.

13 Claims, 9 Drawing Sheets

FAST REMOTE EXECUTION BETWEEN MOBILE DEVICES

FIELD OF THE INVENTION

The present invention relates generally to mobile devices. More particularly, the present invention is related to allowing mobile devices to execute commands remotely, automatically, and immediately through networking messages.

BACKGROUND OF THE INVENTION

The use of mobile communication devices, such as mobile phones, has become very prevalent in our society. Most individuals own a mobile phone and carry it with them most of the time. This includes even children, as more and more parents are electing to equip their children with the devices in order to better protect their children and/or monitor their locations.

Children can be taught how to dial particular phone numbers in emergency situations, such as dialing "911" or dialing a parents number (or selecting such numbers from a speed dial list). Likewise, texting messages, such as through Short Message Service (SMS) can also be used to alert authorities or parents of emergencies.

These solutions, however, suffer from three main drawbacks. First of all, there is a level of complexity that is involved in dialing a phone number or texting a particular entity. While many children are quite adept at using mobile devices, perhaps even better than their parents, some children are not, including younger children who may not have the motor skills or sophistication to be able to execute complicated commands on the devices. Furthermore, even children who are adept at using mobile phones may easily panic in emergency situations and be unable to use the device to call for help, either because they momentarily forget how or who to send the proper communication, or because they are so frightened that their hands are shaking so badly that they cannot perform the fine motor skills necessary to dial or text. Indeed, this problem is not just unique to children, as adults can also suffer the same limitations.

Second of all, the device may not always be in a location where direct communication between the device and the intended recipient (e.g., parent, authorities, etc.) is possible. For example, if the emergency message is to be sent via the Internet, the mobile device may not be in a location where EDGE, 3G, 4G, or some other Internet connectivity compatible with the mobile phone is available. Furthermore, in times of mass emergency, such as earthquakes, hurricanes, etc., it is possible that both voice calling and Internet connectivity may be unavailable, but SMS communication remains viable.

Third of all, communication to certain people, such as a parent, may not always be possible, even when connectivity between devices is possible. For example, the parent may have their phone turned off, or may be otherwise engaged and be unable to pick up the phone. In such times, the child may lose valuable time attempting to contacting the particular parent before giving up and trying to contact someone else (such as another parent, relative, family friend, etc.).

What is needed is a solution that addresses all of these issues.

SUMMARY OF THE INVENTION

Embodiments are provided that allow mobile devices to remotely execute commands, such as the generation and sending of emergency messages over the Internet.

In a first embodiment of the present invention, a method for remotely executing a command on a mobile device is provided. Here, a command to execute is received at a first mobile device, wherein the command includes a communications command requiring the use of a first communications medium. Then it is determined if the first mobile device can access the first communications medium. When the first mobile device cannot access the first communications medium, the command is forwarded via a second communications medium to a second mobile device for execution. When the first mobile device can access the first communications medium, the command is executed.

In a second embodiment of the present invention, a method for causing the remote execution of a command from a first mobile device is provided. A shaking motion of the first mobile device is detected, wherein the shaking motion has a frequency, an intensity, and a length of time. It is determined that the shaking motion represents a request to send an emergency message if the frequency exceeds a first predefined threshold, the intensity exceeds a second predefined threshold, and the length of time exceeds a third predefined threshold. It is then determined if the first mobile device has Internet connectivity. When the first mobile device does not have Internet connectivity, a command is sent to a second mobile device to attempt to send an emergency message, wherein the command is sent to the second mobile device using a non-Internet based communications medium.

In a third embodiment of the present invention, a method for causing the remote execution of a command from a first device is provided. A shaking motion of the first device is detected, wherein the shaking motion has a frequency, an intensity, and a length of time. Then it is determined that the shaking motion represents a request to send an emergency message if the frequency exceeds a first predefined threshold, the intensity exceeds a second predefined threshold, and the length of time exceeds a third predefined threshold. The location of the first device is then determined. Then it is determined if the first device has Internet connectivity. When the first device does not have Internet connectivity, a command is sent to a second device to attempt to send an emergency message, wherein the command is sent to the second device using a non-Internet based communications medium, wherein the emergency message includes the determined location of the first device.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In a first embodiment of the present invention, a user is able to automatically communicate with a group of predefined contacts and send a predefined emergency message by shaking a mobile device vigorously. An accelerometer or other sensor(s) in the mobile device can measure the frequency and intensity of the shaking, and if those measurements exceed a given threshold, determine that an emergency message must be sent. This emergency message may be sent to multiple contacts simultaneously, thus saving precious time in an emergency in case one or more of the contacts is unavailable or unreachable.

Furthermore, remote execution is performed in cases where the user's immediate device is unable to complete the execution of the command to send the emergency message. In such cases, the command is forwarded to another device who attempts to execute the command. The command can be repeatedly forward to other devices until finding a device which can complete execution of the command.

In a second embodiment of the present invention, remote execution is used to gather data and return the data to the original device.

Relay Urgent Message Embodiment

Figure 1:
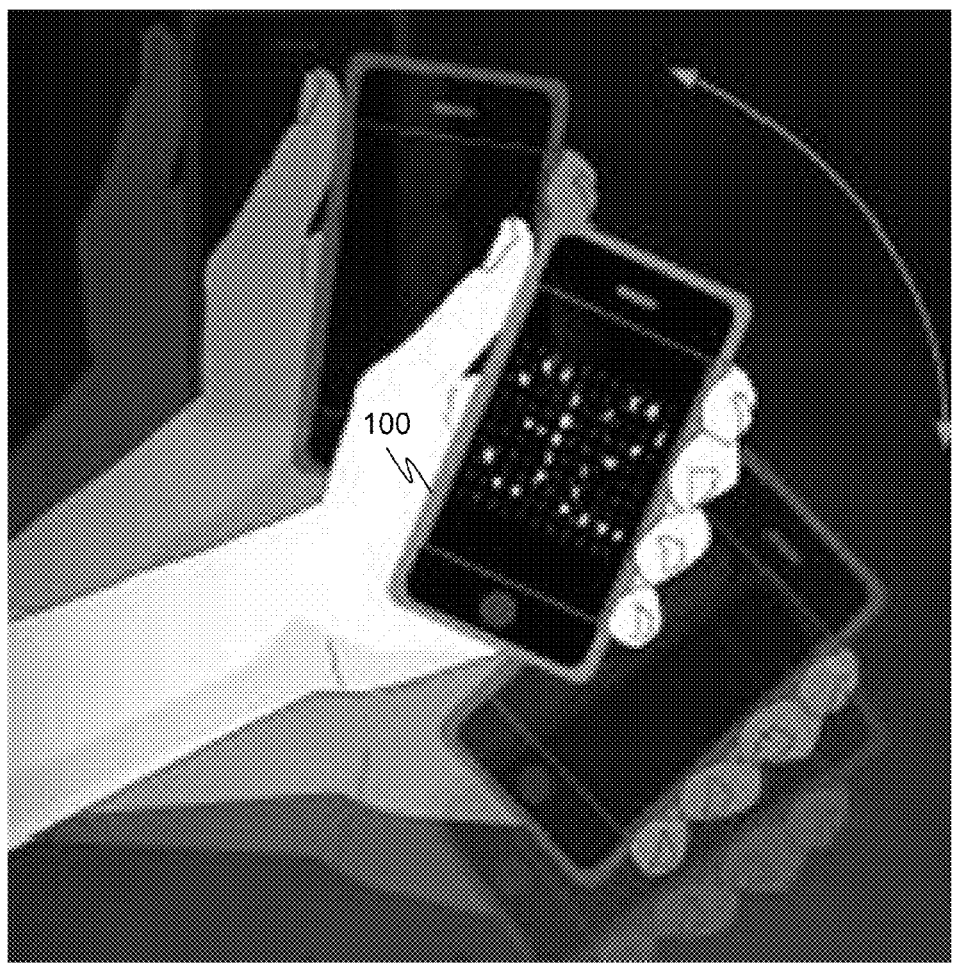
FIG. 1 is a diagram illustrating an example of a "shaking" action that will trigger the automatic communication of an emergency message in accordance with an embodiment of the present invention.

FIG. 1 is a diagram illustrating an example of a "shaking" action that will trigger the automatic communication of an emergency message in accordance with an embodiment of the present invention. An accelerometer located in device 100 can be used to detect the shaking motion. Assuming the intensity of the shaking is great enough (i.e., greater than a predefined intensity threshold), and the frequency of the shaking is high enough (i.e., greater than a predefined frequency threshold), the device may monitor the accelerometer to determine if the shaking continues long enough to warrant the conclusion that the user intends to send an emergency message, such as if the shaking lasts longer than a predefined amount of time, for example 3 seconds). It should be noted that in some embodiments the device may not always be in a state in which shaking can be detected. For example, the device may be off, or in a sleep mode. In such cases, it may be necessary for the user to first turn on the device, or bring it out of sleep mode, prior to beginning the shaking motion.

Figure 2:
FIG. 2 is a diagram illustrating an example of an application (or "app") installed on the mobile device that allows the user to quickly generate an emergency message in accordance with an embodiment of the present invention

Of course, not all embodiments require that the "shaking" action be performed in order for an emergency message to be generated. In some embodiments, the user of the device may use more traditional means to generate an emergency message. FIG. 2 is a diagram illustrating an example of an application (or "app") installed on the mobile device that allows the user to quickly generate an emergency message in accordance with an embodiment of the present invention. Here, the user, such as a kid, can easily press a large button 200 in the middle of the display to generate an emergency message.

In addition to the mechanisms described above, there may be additional ways a user can indicate that an emergency is taking place. For example, the user could speak loudly with a predefined keyword, such as "SOS help help!". Alternatively, the user can dial a predefined phone number, such as "9999". Alternatively, the user can move the phone in another type of gesture, such as moving the phone clockwise or counter-clockwise rapidly.

Figure 3:
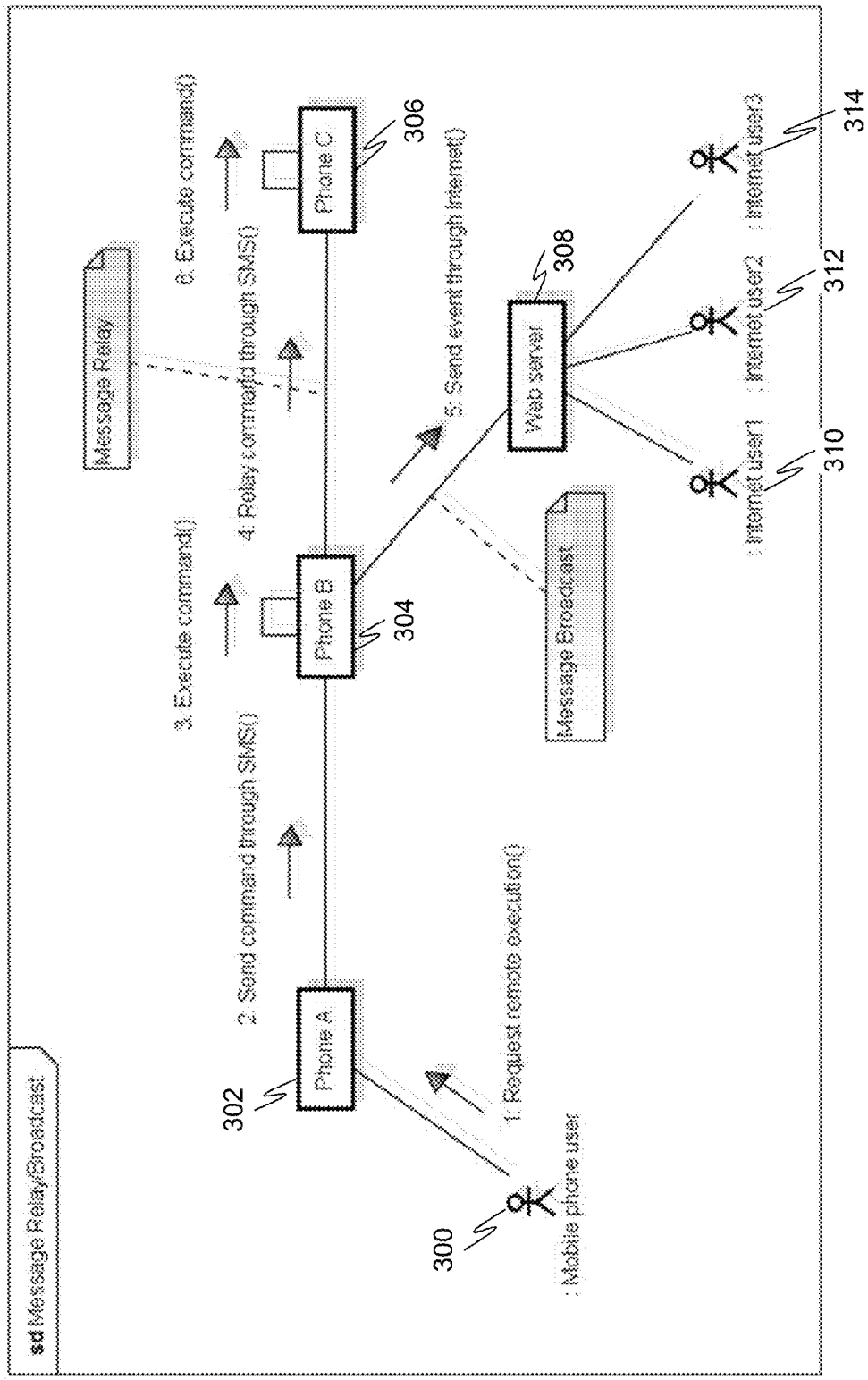
FIG. 3 is a high-level view of a remote execution process in accordance with an embodiment of the present invention.

Regardless of how the user signals that an emergency message is to be generated, the execution of this emergency message may be performed remotely. FIG. 3 is a high-level view of a remote execution process in accordance with an embodiment of the present invention. Here, user 300, such as a child, wishes to use a mobile device, such as phone A 302, to transmit an emergency message not only using SMS but also using the Internet. This would allow, for example, relatives who do not have mobile phones (or do not have them on) to also receive the emergency message through the Internet. In this example, however, phone A 302 may not be in a service area where mobile Internet is available (or, alternatively, phone A 302 may not even have a service plan where mobile Internet is active). Here, the user 300 requests remote execution of a command on phone A 302 (the command being to send an emergency message to several contacts). Rather than execute this command locally, some or all of the command may be sent to a remote device 304, for execution of the command. This device (phone B 304), has both SMS and Internet connectivity. If it lacked Internet connectivity for example, it may continue to forward the command on to phone C 306 for execution. As it stands in this example, however, phone B 304 has Internet connectivity. As such, it sends an event to a web server 308 via the Internet. Web server 308 may then broadcast the emergency message via the Internet to various other users 310, 312, and 314.

In one embodiment, the command sent between devices to be executed remotely is sent via SMS, since as described earlier SMS communication is one of the more reliable communications mediums during emergencies. The command may then be executed on the recipient device, but if it cannot be so executed, it may be forwarded on to another device, and so on, until finding a device that can execute the command.

Figure 4:
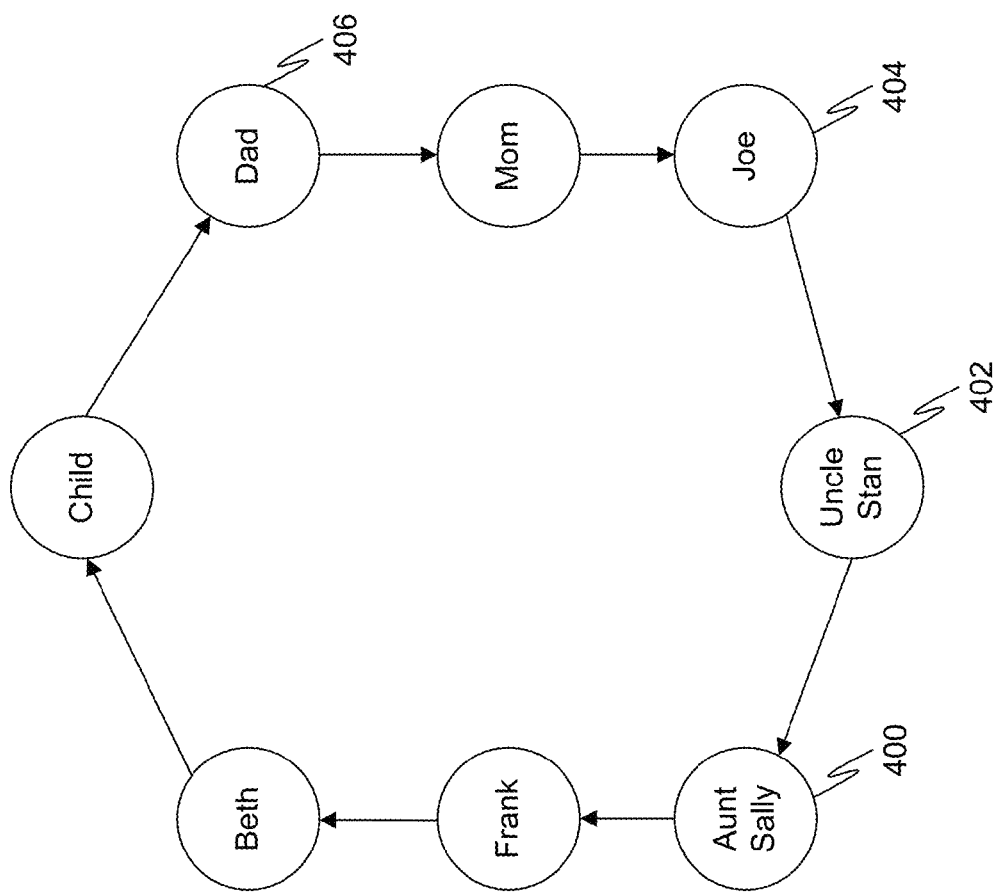
FIG. 4 is an example of a chain of devices in accordance with an embodiment of the present invention.

The chain of devices to which the command is forwarded may be established by a user and stored on device 302. FIG. 4 is an example of a chain of devices in accordance with an embodiment of the present invention. Any number of devices may be included in this chain. The larger the number of users, the more likely it is that some device (owned by one of the users) in the chain will eventually be able to execute the command. It should be noted that while in this example there is a precise ordering defined for the chain (Aunt Sally 400 is shown as coming after Uncle Stan 402 who is after Family friend Joe 404), there is no requirement that the forwarding ordering actually follows a predefined path. In one embodiment, a random device from the chain is simply picked at the time the user signals an emergency message must be sent. There may be circumstances where such a randomized selection of device is beneficial, since the user's initial selection of ordering may be imperfect, e.g., Dad 406 may often be in areas where no cellular reception is possible.

It should also be noted that the devices in the chain may or may not reflect the complete list of devices to which the eventual emergency message may be sent. There may be, for example, two or more different lists maintained by a user's mobile telephone. The first list may be the chain of devices to which commands should be forwarded for remote execution. The second list may be a list of contacts to which an emergency message should ultimately be sent from whatever device is able to do so. In some embodiments these lists may be identical. In others they will be different.

In one embodiment, the emergency list is stored in a cloud, and a mobile application can synchronize with the cloud automatically to update and distribute the list. Additionally, in one embodiment, the mobile application, upon detecting an emergency, attempts to send the command to the first device in the list, and if that fails, it tries the second device in the list, and so on. If there is a device in the list that repeatedly fails to execute or receive the command, this device may be lowered in priority down the list so that another device receives the command first.

Indeed, it should be noted that in some embodiments a dedicated SMS device may be established in each chain of device, with the dedicated SMS device being always active and ready to communicate via both SMS and the Internet. In one example, a business, such as a cell phone carrier or a software company that distributes the software applications used by the present invention, may maintain one or more such devices in the network. In another example, the user may purchase a stand-alone dedicated device that is maintained in the home for such purposes.

Obtaining User Information Embodiment

Figure 5:
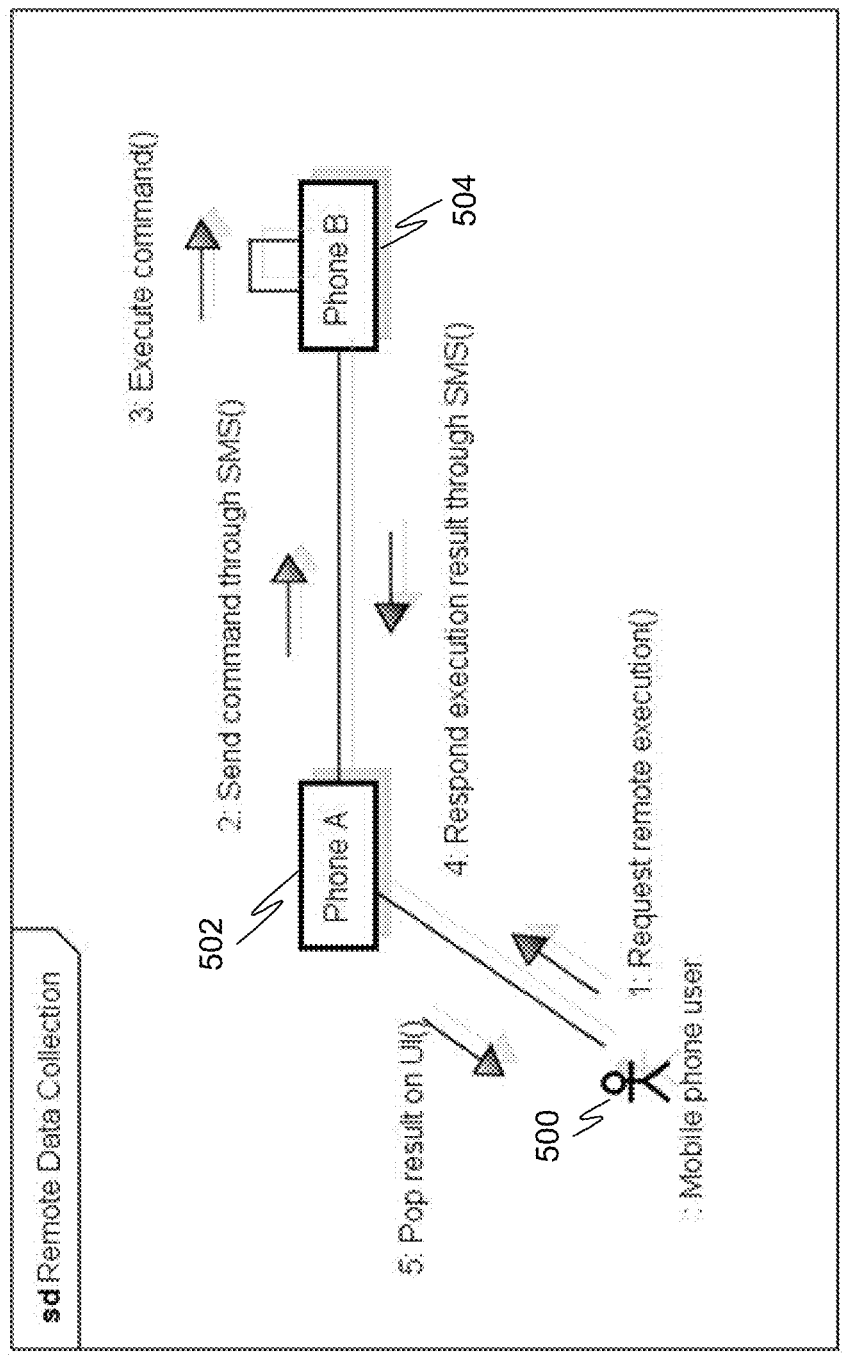
FIG. 5 is an example remote data gathering process in accordance with an embodiment of the present invention.

In another embodiment of the present invention, rather than, or in addition to, an emergency message being sent out, a user is trying to gather information about another user quickly. For example, a parent may lose track of a child while shopping and then want to know the child's location quickly. FIG. 5 is an example remote data gathering process in accordance with an embodiment of the present invention. Here, user 500 may request remote execution of a command, such as a location gathering command, to device 502. This device may then send this command through SMS to device 504, which the device most closely associated with the user on which the information should be gathered. Device 504 then executes the command (e.g., gathers its location), and the execution result is sent back to device 502 via SMS. The result may then be presented to user 500 via a user interface.

It should also be noted that embodiments are foreseen that combine the emergency message aspect and the remote location finder aspect. For example, when an emergency message is generated by a device, it may also act to gather the device's location and that location may be forwarded along with the emergency message to the remote device for execution, which may include passing the location along to the ultimate recipients of the emergency message.

Other Embodiments

In another embodiment of the present invention, the ultimate device that is able to remotely execute the command (in the chain of devices) acts to publish the emergency message in several ways using the Internet. This may include sending emails to users, creating a Twitter™ tweet, publishing a Facebook™ or MySpace™ update (i.e., putting a message on a social networking website), or sending a Google+™ message.

In some embodiments, rather than blindly passing on the command to a next device, the sending device actively checks up to ensure that the subsequent device is handling the command. This may include, for example, waiting for confirmation from the subsequent device that the command has been received and can be handled. Reasons why the subsequent device may not be able to handle the command include it being powered off, lacking any sort of communicability (such as cellular reception dropping out right after it receives the command from the previous device).

The command receiver may respond to the command sender, no matter whether they are able to execute the command or not. If the command sender does not get a response from the receiver after a predefined time, the command sender knows the command was not received successfully. In such an instance, the sender will find another device in the chain to send the command to.

The software and/or hardware that performs the steps of the present invention may be located in many different locations. Some of the steps may be performed on a user's mobile device. Others of the steps may be performed on an intended recipient's mobile device. Others of the steps may be performed on an intermediate mobile device. Still further steps may be performed on a web server. Each of the locations will be described in more detail below.

System Process

Figure 6:
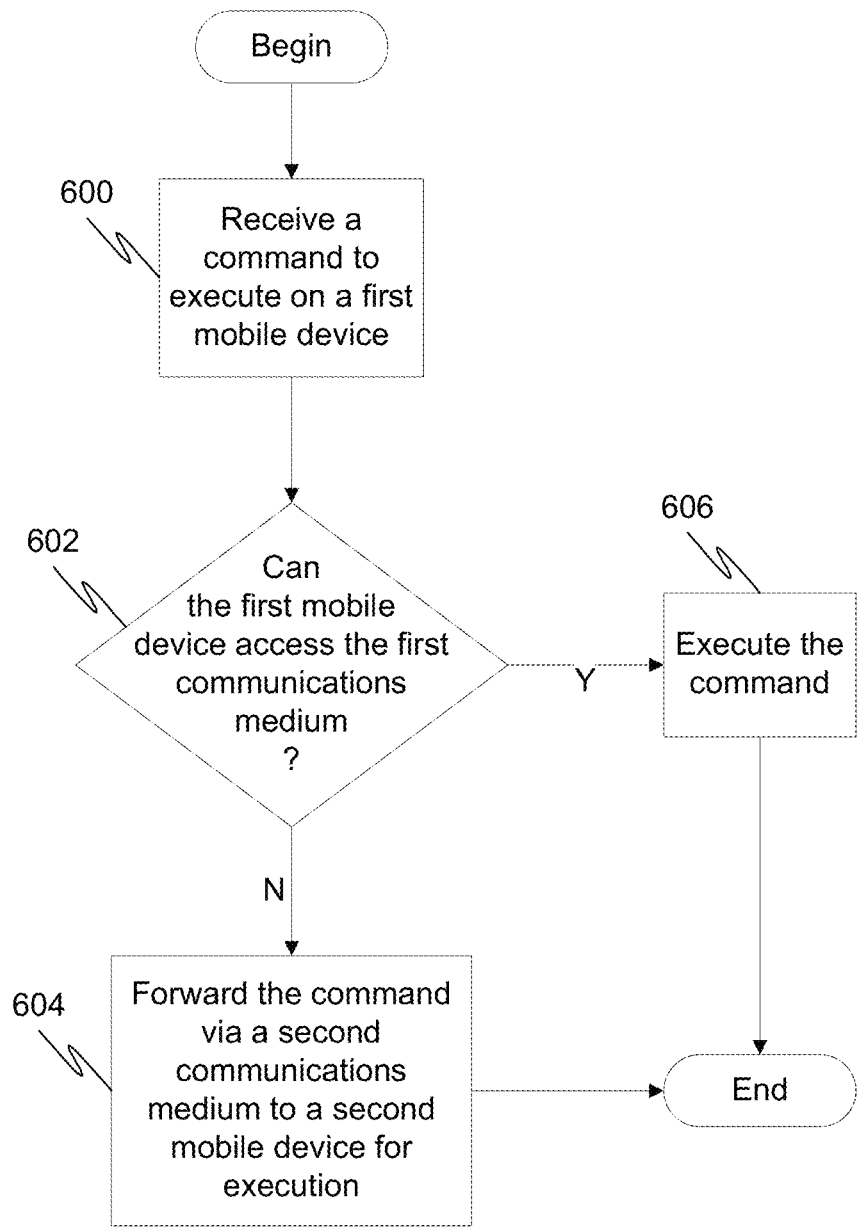
FIG. 6 is a flow diagram illustrating a method for remotely executing a command on a mobile device in accordance with an embodiment of the present invention.

FIG. 6 is a flow diagram illustrating a method for remotely executing a command on a mobile device in accordance with the first embodiment of the present invention. This method may be executed on a different mobile device than the one operated by the user who is having an emergency. At 600, a command to execute is received on a first mobile device. The command may include a communications command requiring the use of a first communications medium, such as SMS. This command may be, for example, a command to generate an emergency message and send the emergency message to one or more contacts via the Internet. At 602, it is determined if the first mobile device can access the first communications medium (for example, does have Internet connectivity). If it is determined that it cannot access the first communications medium, at 604 the command is forwarded via a second communications medium (e.g., SMS) to a second mobile device for execution. If it is determined that it can access the first communications medium, at 606 the command may be executed.

Figure 7:
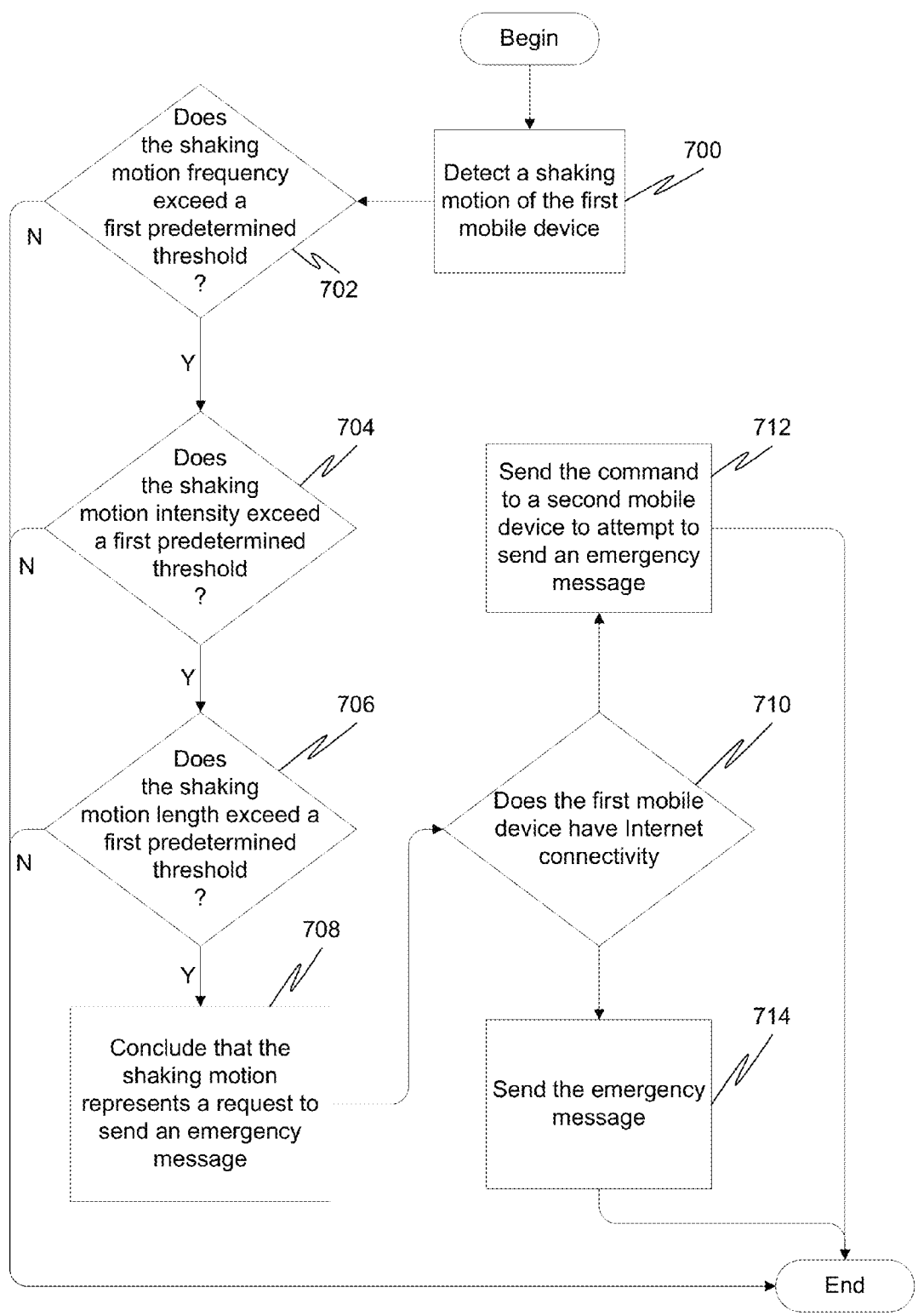
FIG. 7 is a flow diagram illustrating a method for causing the remote execution of a command from a first mobile device in accordance with another embodiment of the present invention.

FIG. 7 is a flow diagram illustrating a method for causing the remote execution of a command from a first mobile device in accordance with another embodiment of the present invention. This method may be executed on the mobile device that is operated by the user who is having an emergency. At 700, a shaking motion of the first mobile device is detected. This detection may be performed using an accelerometer embedded in the first mobile device. At 702, it is determined if the shaking motion frequency exceeds a first predetermined threshold. In one embodiment, this frequency threshold is equal to or greater to three "shakes" (each "shake" being a combination of an up and a down motion) within the measured period. If this threshold is exceeded, then at 704 it is determined if the shaking motion intensity exceeds a second predetermined threshold. In one embodiment, this intensity threshold is 300 meters per second squared. If this threshold is exceeded, then at 706, it is determined if the length of time that the shaking motion continues exceeds a third predetermined threshold. In one embodiment, this duration is 3 seconds. If this threshold is exceeded, then at 708 the system concludes that the shaking motion represents a request to send an emergency message.

It should be noted that in one embodiment a "cancel" action may be provided, where a user who inadvertently triggers an emergency message can cancel the message. For example, the user may turn off the power button.

At 710, it is determined if the first mobile device has Internet connectivity. If not, then at 712 a command is sent to a second mobile device to attempt to send an emergency message. This command is sent using a non-Internet based communications medium, such as SMS. In one embodiment, the SMS message contains a keyword, so that the command receiver knows where the command is located in the SMS message. For example, a call for help may be encoded in SMS as #k@pHelp!_http://maps.google.com/maps?q=25.02604, 121.548378. If the first mobile device has Internet connectivity, then at 714 the first mobile device can simply send the emergency message via the Internet itself.

Figure 8:
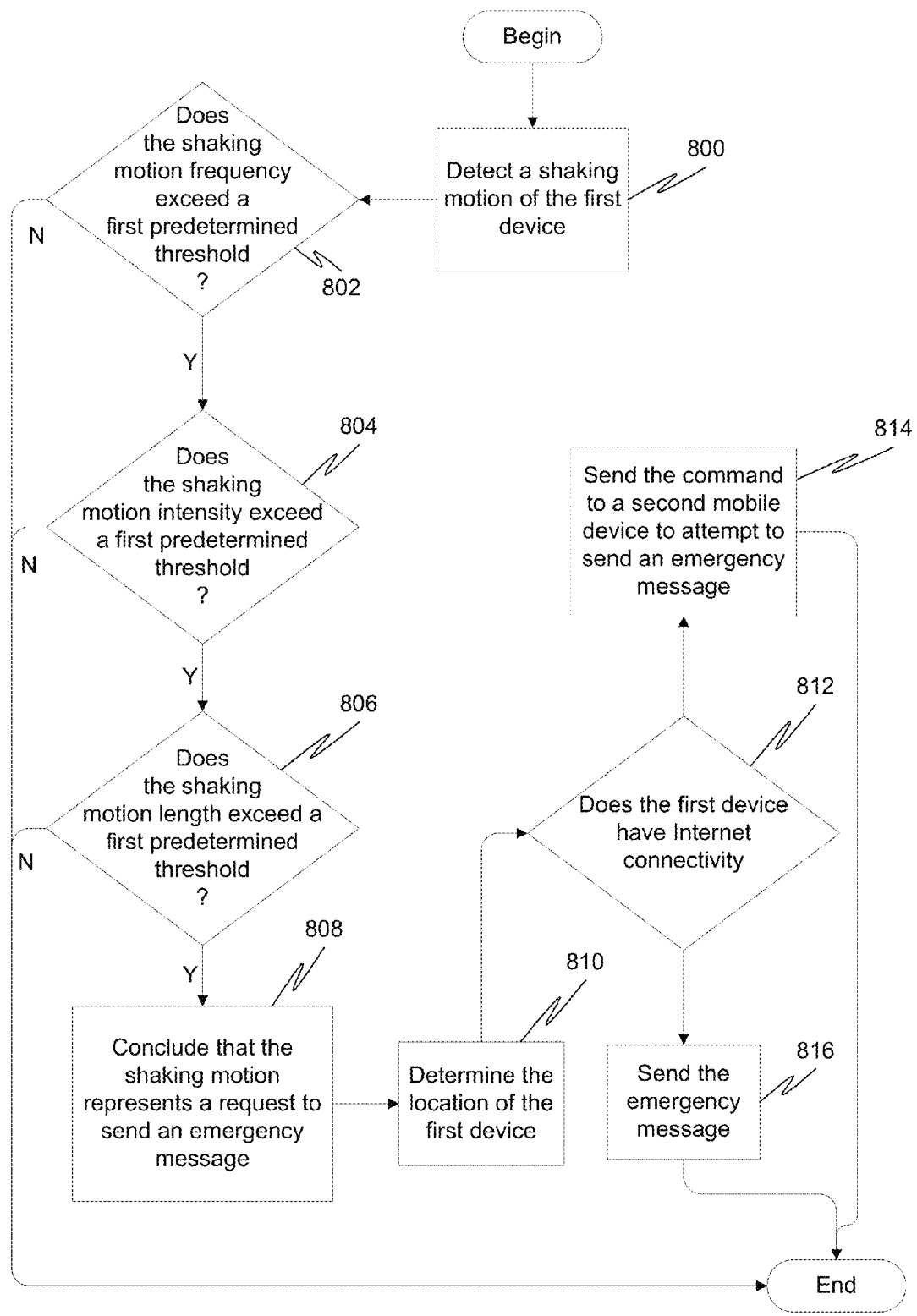
FIG. 8 is a flow diagram illustrating a method for causing the remote execution of a command from a first mobile device in accordance with yet another embodiment of the present invention.

FIG. 8 is a flow diagram illustrating a method for causing the remote execution of a command from a first mobile device in accordance with yet another embodiment of the present invention and explains FIG. 3 in more detail. This method may be executed on the mobile device that is operated by the user who is having an emergency. At 800, a shaking motion of the first mobile device is detected. This detection may be performed using an accelerometer embedded in the first mobile device. At 802, it is determined if the shaking motion frequency exceeds a first predetermined threshold. If so, then at 804 it is determined if the shaking motion intensity exceeds a second predetermined threshold. If so, then at 806, it is determined if the length of time that the shaking motion continues exceeds a third predetermined threshold. If so, then at 808 the system concludes that the shaking motion represents a request to send an emergency message. At 810, the location of the first device is determined. At 812, it is determined if the first mobile device has Internet connectivity. If no, then at 814 a command is sent to a second mobile device to attempt to send an emergency message, wherein the emergency message includes the determined location of the first device. The user's longitude and latitude can be obtained via a GPS device in the user's phone. A URL can then be created which leverages $3^{rd}$ party technology or web sites to provide a map to the recipient. This URL can then be embedded into the command within the SMS message. This command is sent using a non-Internet based communications medium, such as SMS.

Mobile Device Embodiment

Figure 9:
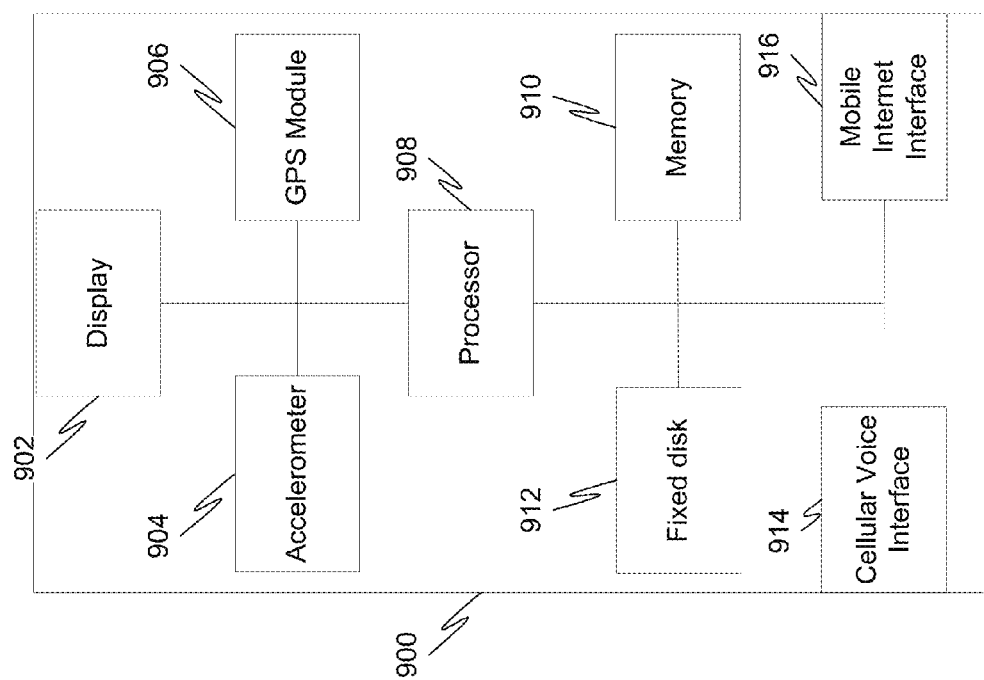
FIG. 9 illustrates a mobile device suitable for implementing embodiments of the present invention.

FIG. 9 illustrates a mobile device 900 suitable for implementing embodiments of the present invention. FIG. 9 shows one possible physical form of the mobile device. Of course, the computer system may have many physical forms including an integrated circuit, a printed circuit board, a small handheld device (such as a mobile telephone or PDA), large handheld device (such as a tablet computer), or laptop computer. In the depicted embodiment, a mobile phone 900 is depicted.

Mobile phone 900 may include a display 902, which may also act as a user input mechanism. In this instance, the display 902 is a touchscreen display. In other non-depicted embodiments the user input mechanism may be physical buttons or other controllers located on the mobile device 900, either in addition to or in lieu of the touchscreen display.

Mobile phone 900 may also include an accelerometer 904. This accelerometer 604 may be used for the "shaking" detection aspects of the present invention, as described earlier, or other motions that might occur when a user is having an emergency and wants to send a message.

Mobile phone 900 may also include a GPS module 906, which may detect the location of the mobile phone 900 using global positioning satellites.

Mobile phone 900 may also include a processor 908 which can be used to execute the various processes of the present invention, among other processes.

Mobile phone 900 may also include various types of memory 910, including random access memory (RAM) and read-only memory (ROM). As is well known in the art, ROM acts to transfer data and instructions uni-directionally to the processor and RAM is used typically to transfer data and instructions in a bi-directional manner. Both of these types of memories may include any suitable of the computer-readable media described below. A fixed disk 912 may also be coupled bi-directionally to processor 908; it provides additional data storage capacity and may also include any of the computer-readable media described below. Fixed disk 912 may be used to store programs, data and the like and is typically a secondary storage medium (such as a hard disk) that is slower than primary storage. It will be appreciated that the information retained within fixed disk 912, may, in appropriate cases, be incorporated in standard fashion as virtual memory in memory 910.

Mobile device 900 may also include various types of communications interfaces. This may include cellular voice interface 914, as well as mobile Internet interface 916. Cellular voice interface 914 may be simultaneously capable of transmitting voice and SMS messages, with SMS communication still being possible even when voice transmission is not due to public emergencies such as power outages from natural disasters and clogged phone lines due to too many subscribers attempting to call at the same time.

Program Storage Device Embodiment

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method for remotely executing a command, the method comprising:
   providing, to a plurality of mobile devices that includes a first mobile device, an emergency list, the emergency list including a chain of contacts defined by a first user;
   receiving, at the first mobile device, a command to execute, wherein the command includes a communications command to generate an emergency message and send the emergency message to one or more contacts in the chain of contacts, wherein execution of the command requires access to the Internet;
   determining, at the first mobile device, if the first mobile device can access the Internet;
   when the first mobile device cannot access the Internet, the first mobile device accessing the emergency list, selecting a remote second mobile device from the emergency list, and forwarding the command via a Short Message Service (SMS) protocol to the remote second mobile device for execution via the Internet, wherein the remote second mobile device forwards the command to another remote device in the chain of contacts when the remote second mobile device does not have access to the Internet; and
   when the first mobile device can access the Internet, executing the command.

2. The method of claim 1, wherein the first mobile device checks whether the remote second mobile device is available to handle the command.

3. The method of claim 1, wherein execution of the emergency message involves posting an emergency message on a social networking website.

4. The method of claim 2, wherein the command to execute is received from a third mobile device and the command to execute was generated automatically by a shaking motion of the third mobile device.

5. A method for causing the remote execution of a command, the method comprising:
   providing to a plurality of mobile devices that includes a first mobile device, an emergency list including a chain of contacts defined by a first user to perform forwarding and execution of an emergency command;
   detecting, at the first mobile device, a shaking motion of the first mobile device, wherein the shaking motion has a frequency, an intensity, and a length of time;
   determining, at the first mobile device, that the shaking motion represents a request to send an emergency message if the frequency exceeds a first predefined threshold, the intensity exceeds a second predefined threshold, and the length of time exceeds a third predefined threshold;
   determining, at the first mobile device, if the first mobile device has Internet connectivity;
   when the first mobile device does not have Internet connectivity, the first mobile device accessing the emergency list, selecting a remote second mobile device from the emergency list, and sending a command via the Short Message Service (SMS) protocol to the remote second mobile device to attempt to send an emergency message, wherein the remote second mobile device is determined by locating the chain of contacts stored on the first mobile device and selecting the remote second mobile device from the chain of contacts, and wherein the remote second mobile device forwards the command to another remote device in the chain of contacts when the remote second mobile device does not have access to the Internet.

6. The method of claim 5, wherein the shaking motion is detected using an accelerometer embedded in the first mobile device.

7. The method of claim 5, wherein the remote second mobile device is determined by one of selecting a device that is next in the chain of emergency contacts and randomly selecting a device from the chain of contacts.

8. A method for causing the remote execution of a command from a first mobile device, the method comprising:
   providing an emergency list including a chain of contacts defined by a first user to perform forwarding and execution of an emergency command;
   detecting, at the first mobile device, a shaking motion of the first mobile device, wherein the shaking motion has a frequency, an intensity, and a length of time;
   determining, at the first mobile device, that the shaking motion represents a request to send an emergency message if the frequency exceeds a first predefined threshold, the intensity exceeds a second predefined threshold, and the length of time exceeds a third predefined threshold;
   determining a location of the first mobile device;
   determining if the first device has Internet connectivity;
   when the first device does not have Internet connectivity, the first mobile device selecting a remote second mobile device from the emergency list and sending a command via the Short Message Service (SMS) protocol to the remote second mobile device in the chain of contacts to send an emergency message via the Internet using the remote second mobile device, wherein the emergency message includes the determined location of the first device, and wherein the remote second mobile device forwards the command to another remote device in the chain of contacts when the remote second mobile device does not have access to the Internet.

9. The method of claim 8, wherein the location is determined using a global positioning service (GPS) module embedded in the first device.

10. The method of claim 8 wherein the sending of the emergency message involves the remote second mobile device posting an emergency message on a social networking website.

11. The method of claim 8, where the first mobile device checks whether the remote second mobile device is available to execute or forward the command.

12. The method of claim 8, wherein the chain of contacts includes a listing of contacts for forwarding an emergency message and a listing of contacts for executing an emergency message.

13. The method of claim 5, wherein the chain of contacts includes a listing of contacts for forwarding an emergency message and a listing of contacts for executing an emergency message.

* * * * *